(12) United States Patent
Wachi et al.

(10) Patent No.: US 10,841,134 B1
(45) Date of Patent: Nov. 17, 2020

(54) EQUALIZER AND EQUALIZING DEVICE

(71) Applicant: Hitachi, Ltd., Tokyo (JP)

(72) Inventors: Yusuke Wachi, Tokyo (JP); Takayasu Norimatsu, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/858,768

(22) Filed: Apr. 27, 2020

(30) Foreign Application Priority Data

Jun. 18, 2019 (JP) ................. 2019-112566

(51) Int. Cl.
*H04L 25/03* (2006.01)
*H04L 27/36* (2006.01)

(52) U.S. Cl.
CPC .. *H04L 25/03038* (2013.01); *H04L 25/03146* (2013.01); *H04L 27/366* (2013.01)

(58) Field of Classification Search
CPC ......... H04L 25/03006; H04L 25/03038; H04L 25/03146; H04L 27/01; H04L 27/366
See application file for complete search history.

(56) References Cited

U.S. PATENT DOCUMENTS

| | | | |
|---|---|---|---|
| 9,049,068 B1* | 6/2015 | Cyrusian | H04L 25/0272 |
| 2004/0141552 A1* | 7/2004 | Yang | H04L 25/03885 |
| | | | 375/229 |
| 2006/0001504 A1* | 1/2006 | Singh | H04L 25/03878 |
| | | | 333/28 R |
| 2009/0302888 A1* | 12/2009 | Shumarayev | H03F 3/45197 |
| | | | 326/62 |
| 2011/0032977 A1* | 2/2011 | Hsiao | H04L 25/03133 |
| | | | 375/232 |
| 2018/0198647 A1 | 7/2018 | Norimatsu | |

FOREIGN PATENT DOCUMENTS

JP   2018-110363 A   7/2018

* cited by examiner

*Primary Examiner* — David B Lugo
(74) *Attorney, Agent, or Firm* — Mattingly & Malur, PC

(57) ABSTRACT

The equalizer has a first differential pair having a first transistor and a second transistor and a second differential pair having a third transistor and a fourth transistor. A first terminal of the first transistor and a first terminal of the third transistor are connected to each other, and a first terminal of the second transistor and a first terminal of the fourth transistor are connected to each other, so that the first differential pair and the second differential pair have common input terminals. Also, resistors are respectively connected to second terminals of the first, second, third, and fourth transistors, a first zero point generation circuit is connected between the second terminal of the first transistor and the second terminal of the second transistor, and a second zero point generation circuit is connected between the second terminal of the third transistor and the second terminal of the fourth transistor.

14 Claims, 19 Drawing Sheets

EQUALIZER AND EQUALIZING DEVICE

CROSS-REFERENCE TO RELATED APPLICATION

The present application claims priority from Japanese application JP 2019-112566, filed on Jun. 18, 2019, the contents of which is hereby incorporated by reference into this application.

BACKGROUND OF THE INVENTION

1. Field of the Invention

The present invention relates to a technology for equalizing a signal waveform, and particularly to an equalizer, an equalizing device, a signal transmission device, and the like.

2. Description of Related Art

Due to the recent increase in communication speed, transmission loss in a communication medium such as on-board wiring and cables for transmitting signals is increasing. Particularly, with regard to the PCI Express interface standard, decisions on the fifth generation standard PCIe 5.0 were completed in 2019, and the communication data volume reaches 32 Gbps/lane on one side, which is twice the previous generation. Generally, a signal transmitted via a communication medium is input to a linear equalizer having a waveform equalizing function. According to the increase of the amount of communication data, the upper limit frequency compensated by the linear equalizer continuously increases (Nyquist frequency of 16 GHz in PCIe 5.0), and the frequency range to be compensated becomes a wide range from a low frequency to a high frequency.

JP-A-2018-0110363 discloses an equalizer that has three zero point frequencies and that enables equalization in a wide frequency range.

However, the equalizer needs to have not only wide frequency characteristics but also a wide variable gain range in order to deal with various wiring lengths of a communication medium such as on-board wiring and a cable. In Example 1 of JP-A-2018-0110363, since the equalizers having three zero point frequencies are connected on the same wiring, the parasitic capacitance on the connection wiring increases, and thus an effect of increasing a variable gain range without decreasing a gain of the equalizer when the lower limit gain is set is not exhibited due to this parasitic capacitance. That is, in the equalization for a communication medium such as on-board wiring or a cable having a short wiring length, it is likely that over-equalization occurs.

SUMMARY OF THE INVENTION

An object of the present invention is to provide an equalizer and an equalizing device having a wide variable gain range and capable of realizing equalization for a communication medium such as on-board wiring or a cable having various wiring lengths.

According to an aspect of the present invention, there is provided an equalizer to which a signal transmitted via a communication medium is input. The equalizer has a first differential pair configured with a first transistor and a second transistor and a second differential pair configured with a third transistor and a fourth transistor. A first terminal of the first transistor and a first terminal of the third transistor are connected to each other, and a first terminal of the second transistor and a first terminal of the fourth transistor are connected to each other, so that the first differential pair and the second differential pair have common input terminals. Also, resistors are respectively connected to second terminals of the first, second, third, and fourth transistors, a first zero point generation circuit is connected between the second terminal of the first transistor and the second terminal of the second transistor, and a second zero point generation circuit is connected between the second terminal of the third transistor and the second terminal of the fourth transistor. Additionally, the first zero point generation circuit and the second zero point generation circuit have the same peak characteristics in design.

According to another aspect of the present invention, there is provided an equalizing device having at least one equalizer. If a bipolar transistor is used as the transistor, the first terminal is a base terminal, the second terminal is an emitter terminal, and the third terminal is a collector terminal. If a MOS transistor is used as the transistor, the first terminal is a gate terminal, the second terminal is a source terminal, and the third terminal is a drain terminal.

According to the present invention, it is possible to provide an equalizer having a wide variable gain range and capable of realizing equalization for a communication medium such as on-board wiring or a cable having various wiring lengths.

DESCRIPTION OF EMBODIMENTS

Figure 1:
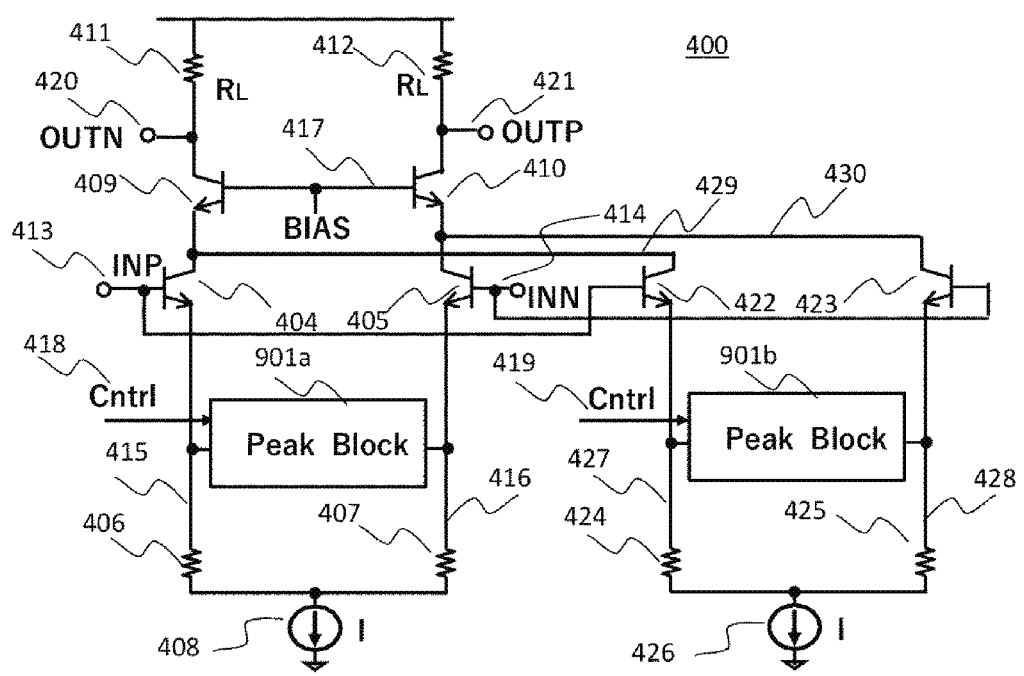
FIG. 1 is a circuit diagram illustrating an equalizer according to Embodiment 1.

Embodiments are described in detail with reference to the drawings. Here, the present invention is not construed as being limited to the description of the embodiments below. It is easily understood by those skilled in the art that the specific configuration can be changed without departing from the spirit or the gist of the present invention.

In the structures of the present invention described below, the same portions or portions having similar functions are commonly denoted by the same reference numerals in different drawings, and description thereof is not repeated in some cases.

When there are a plurality of elements having the same or similar functions, the same reference numerals may be given different suffixes for explanation. However, when it is not necessary to distinguish a plurality of elements, the description is made with suffixes omitted in some cases.

Notations such as "first", "second", and "third" in the present specification and the like are used to identify constituent elements and do not necessarily limit the number, order, or content thereof. Also, numbers for identifying constituent elements are used for each context, and numbers used in one context do not necessarily indicate the same configuration in another context. Also, this does not prevent a constituent element identified by a certain number from also serving the function of a constituent element identified by another number.

The position, size, shape, range, or the like of each configuration illustrated in the drawings and the like do not accurately represent the actual position, size, shape, range, or the like, for easier understanding of the invention, in some cases. For this reason, the present invention is not necessarily limited to the position, size, shape, range, and the like illustrated in the drawings and the like.

Publications, patents, and patent applications referred to in the present specification form a part of the description of the present specification without change.

The constituent elements described in a singular form in the present specification include those in a plural form unless specifically stated otherwise.

An aspect of the embodiments is an equalizer to which a signal transmitted via a communication medium for transmitting a signal is input, two differential pairs configured with four bipolar transistors of first to fourth bipolar transistors having common base input terminals are provided, resistor elements and zero point generation circuits are connected between respective emitter terminals of the two differential pairs, collector terminals having the same polarity of the differential pair are connected to each other, the collector terminals are connected to emitter terminals of the fifth and sixth bipolar transistors, base terminals of the fifth and sixth bipolar transistors are connected to a certain bias voltage, the collector terminals of the fifth and sixth bipolar transistors are connected to load elements, the fifth and sixth collector terminals become output terminals of the equalizer, and the two zero point generation circuits have the same peak characteristic.

An equalizing device according to an aspect of embodiments has an equalizing device having the equalizer.

Embodiment 1

FIG. 1 is a circuit diagram illustrating Embodiment 1 which is one of the embodiments of the present invention. As illustrated in FIG. 1, an equalizer 400 is an equalizer to which signals (INP and INN) transmitted via a communication medium for transmitting signals are input. The equalizer includes two differential pairs configured with four bipolar transistors of first to fourth bipolar transistors 404, 405, 422, and 423 having common base input terminals 413 and 414. Resistors 406, 407, 424, and 425, and two zero point generation circuits (Peak Block) 901a and 901b are connected between emitter node wiring 415 and 416 and between emitter node wiring 427 and 428 of two respective differential pairs.

Collector terminals having the same polarity of the differential pairs are connected to each other by wiring 429 and 430. The collector terminals are connected to emitter terminals of fifth and sixth bipolar transistors 409 and 410 that configure a cascode amplifier. Base terminals of the fifth and sixth bipolar transistors 409 and 410 are connected to a certain bias voltage (BIAS) 417. The collector terminals of the fifth and sixth bipolar transistors 409 and 410 are connected to load resistors 411 and 412. The collector terminals of the fifth and sixth bipolar transistors 409 and 410 become output terminals (OUTP and OUTN) 420 and 421 of the equalizer 400. A bias current source 408 that configures the first differential pair and a bias current source 426 that configures the second differential pair are included.

The two zero point generation circuits 901a and 901b have substantially the same peak characteristics. The peak characteristics of the zero point generation circuits 901 can be adjusted by control signals (Cntrl) 418 and 419. Accordingly, it is possible to provide an equalizer having a wide variable gain range and capable of realizing equalization for a communication medium such as on-board wiring or a cable having various wiring lengths. Hereinafter, the effects of the embodiments of the present invention are described in detail with reference to comparative examples and layout drawings.

Figure 2:
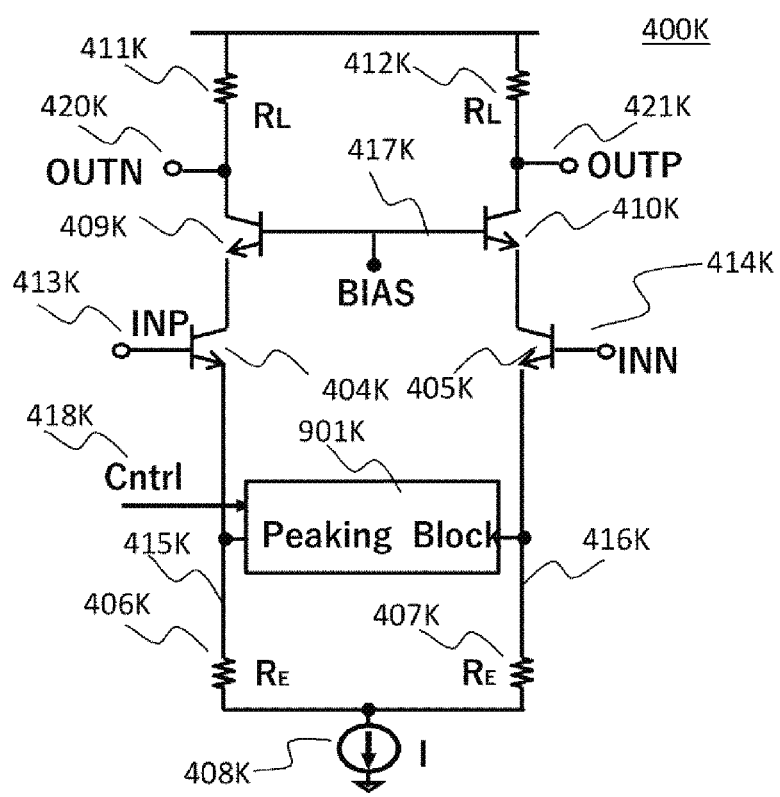
FIG. 2 is a circuit diagram illustrating an equalizer of a comparative example.

FIG. 2 is a circuit diagram of an equalizer 400K formed as a comparative example by the inventors with reference to the configuration of the equalizer described in JP-A-2018-0110363, for example. Compared with the embodiment illustrated in FIG. 1, only one differential pair and one zero point generation circuit 901K are provided. Configurations corresponding to FIG. 1 are denoted by the same reference numerals, but a suffix K may be used in order to clarify the distinction between the embodiment and the comparative example.

Figure 3:
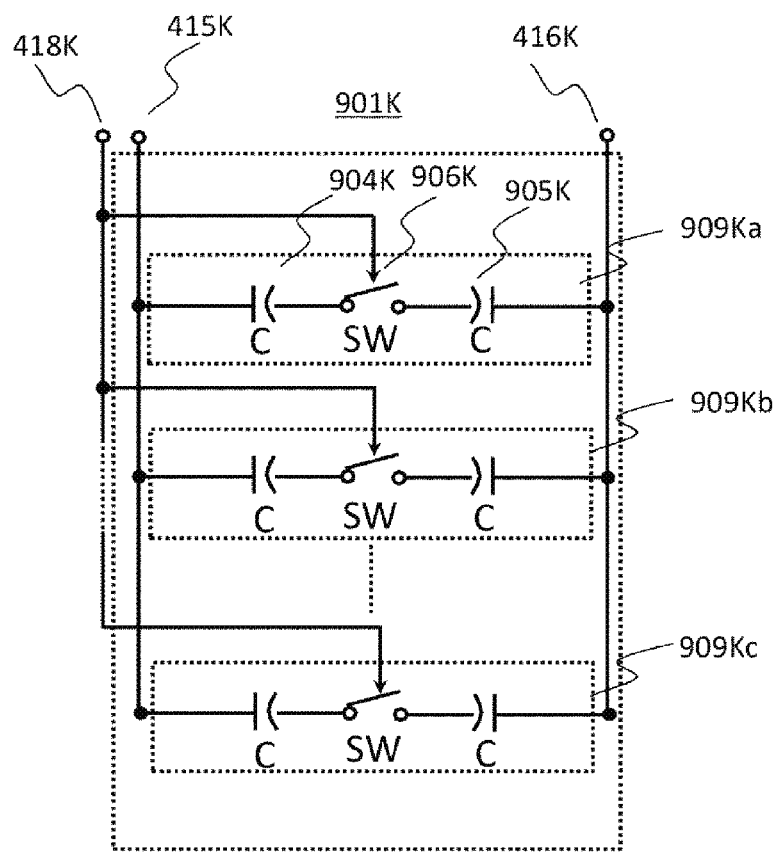
FIG. 3 is a circuit diagram illustrating an example of a zero point generation circuit of the equalizer of the comparative example.

FIG. 3 illustrates an example of the zero point generation circuit 901K that configures the equalizer 400K of the comparative example of FIG. 2. The zero point generation circuit 901K is configured with one or more zero point generation unit circuits 909Ka, 909Kb, and 909Kc, and each zero point generation unit circuit 909K is configured with one or more capacitors (C) 904K and 905K and an ON/OFF changeover switch (SW) 906K. The changeover switch 906K is controlled with a control signal 418K, capacitors (C) attached to emitter node wiring 415K and 416K are switched, so that the frequency of the zero point generated by resistors (RE) 406K and 407K can be switched.

Figure 4:
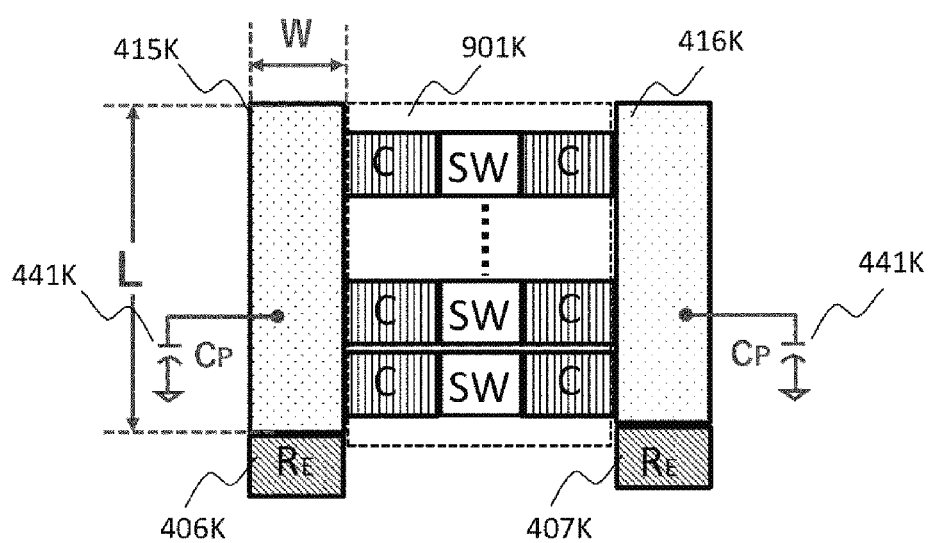
FIG. 4 is a layout image diagram of emitter terminal wiring and the zero point generation circuit of the equalizer of the comparative example.

FIG. 4 schematically illustrates a chip layout of the zero point generation circuit 901K of FIG. 3. Here, W denotes wiring widths of the emitter node wiring 415K and 416K, and L denotes wiring lengths of the emitter node wiring 415K and 416K. The wiring width W is determined according to the current density defined by the electromigration rule. As the operation frequency of the circuit increases, the current value increases in order to secure high frequency characteristics, and thus the wiring becomes thicker. Meanwhile, as the number of blocks that configures the zero point generation circuit increases, and as the physical size of a capacitive element and the like that configure the zero point generation unit circuit increases, the wiring length L becomes longer.

A parasitic capacitor ($C_p$) 441K proportional to an area W×L obtained by the wiring width W and the wiring length L is added to the emitter node wiring 415K and 416K. That is, not only the capacitors that configure the zero point generation circuit 901K but also the parasitic capacitors $C_p$ thereof are unnecessarily connected to the emitter node wiring 415K and 416K. Influences of the parasitic capacitor $C_p$ are described with reference to FIGS. 5A and 5B. In the circuit of a comparative example of FIG. 2, the zero point frequency when the upper limit gain for setting the peak gain to the maximum is set (all the changeover switches 906K are ON) is $1/(2\pi \times RE \times (C_p + C_{HF\_15}))$. Meanwhile, the zero point frequency when the lower limit gain for setting the peak gain to the minimum is set (all the changeover switches 906K are OFF) is $1/(2\pi \times RE \times (C_p + C_{HF\_0}))$. In this example, the number of stages of the zero point generation circuit 901K is 15, and $C_{HF\_n}$ is a capacitance value configured by the zero point generation circuit 901K when n stages are connected.

Figure 5A:
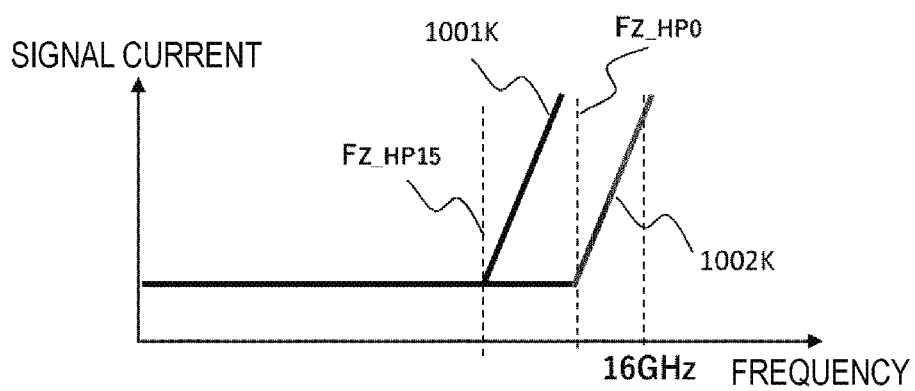
FIG. 5A is a graph schematically illustrating a signal current according to a zero point frequency of the equalizer of the comparative example.

FIG. 5A is a graph schematically illustrating a signal current according to the zero point frequency of the equalizer 400K of FIG. 2. A frequency characteristic 1001K of the signal current when the upper limit gain is set and a frequency characteristic 1002K of the signal current when the lower limit gain is set are illustrated. Also, a zero point frequency $FZ_{HP\_15}$ when the upper limit gain is set and a zero point frequency $FZ_{HP\_0}$ when the lower limit gain is set are illustrated. As illustrated in the drawings, the zero point frequency becomes a frequency at which the rise of the signal starts.

Here, $FZ_{HP\_15} = 1/(2\pi \times RE \times (C_p + C_{HF\_15}))$, $FZ_{HP\_0} = 1/(2\pi \times RE \times (C_p + C_{HF\_0}))$, and $C_{HF\_15} > C_{HF\_0}$ are satisfied.

RE is resistance values of the resistors 406K and 407K.

Figure 5B:
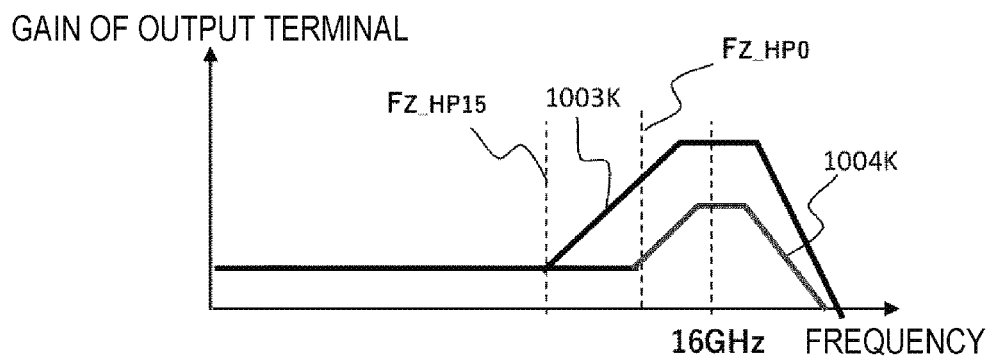
FIG. 5B is a graph schematically illustrating a gain of an output terminal according to the zero point frequency of the equalizer of the comparative example.

FIG. 5B is a graph schematically illustrating the gain of the output terminal according to the zero point frequency of the equalizer of FIG. 2. A frequency characteristic 1003K of the gain when the upper limit gain of the equalizer is set and a frequency characteristic 1004K of the signal current when the lower limit gain of the equalizer is set are illustrated. Further, the zero point frequency $FZ_{HP\_15}$ when the upper limit gain is set and the zero point frequency $FZ_{HP\_0}$ when the lower limit gain is set are illustrated.

As illustrated in FIG. 5A, the signal current flowing through the load resistors (RL) 411K and 412K starts increasing from the zero point frequency. Here, if the capacitive element size of the zero point generation circuit is increased or the number of block of the zero point generation unit circuit is increased, in order to secure the gain when the upper limit gain is set, the length of the connected wiring increases, and the parasitic capacitor $C_p$ increases, such that the parasitic capacitor $C_p$ when the lower limit gain is set becomes dominant. Therefore, the zero point frequency $FZ_{HP\_0}$ when the lower limit gain is set cannot be shifted to the high frequency side. Accordingly, with respect to the gain characteristics in the output terminal in FIG. 5B, the desired gain can be secured when the upper limit gain is set at a desired frequency (for example, the Nyquist frequency 16 GHz of PCIe 5.0), but there is a problem in that the gain cannot be reduced to the desired gain when the lower limit gain is set.

Figure 6:
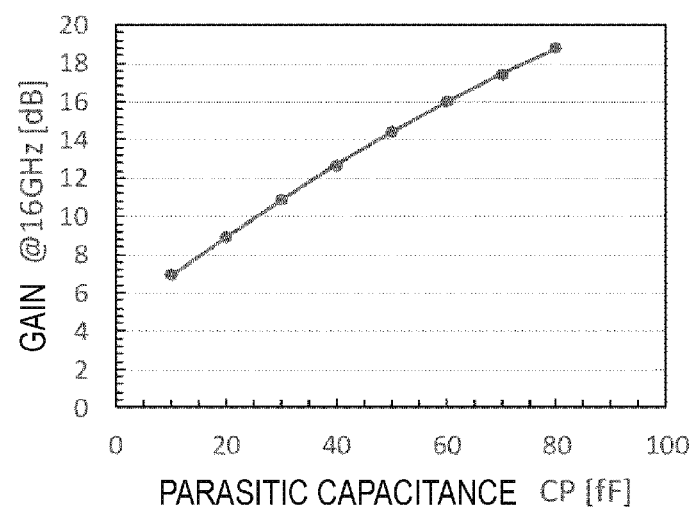
FIG. 6 is a graph illustrating a parasitic capacitance of the emitter terminal wiring and dependence of a gain in lower equalization gain setting.

FIG. 6 illustrates an equalization gain when the lower limit gain is set at 16 GHz with respect to the parasitic capacitor $C_p$ of the emitter node wiring 415 and 416. As presented by this result, it can be confirmed that the influence of the parasitic capacitor $C_p$ is very large.

Meanwhile, in the equalizer 400 according to Embodiment 1 of the present invention illustrated in FIG. 1, the current flowing through the emitter node wiring 415, 416, 427, and 428 can be reduced to ½ of the circuit of FIG. 2, by dividing the differential pairs and the zero point generation circuits into two to be connected to the resistors 406, 407, 424, and 425, and thus the wiring width W can be reduced to ½. In order to secure the direct current operating point which is the same as that of the circuit of FIG. 2, the resistance values of the resistors 406, 407, 424, and 425 become 2RE which is two times of 406K and 407K. The resistance value becomes two times, but the current becomes half, so the resistance width is reduced to ½, and the area of the resistance is also reduced to ½.

Figure 7:
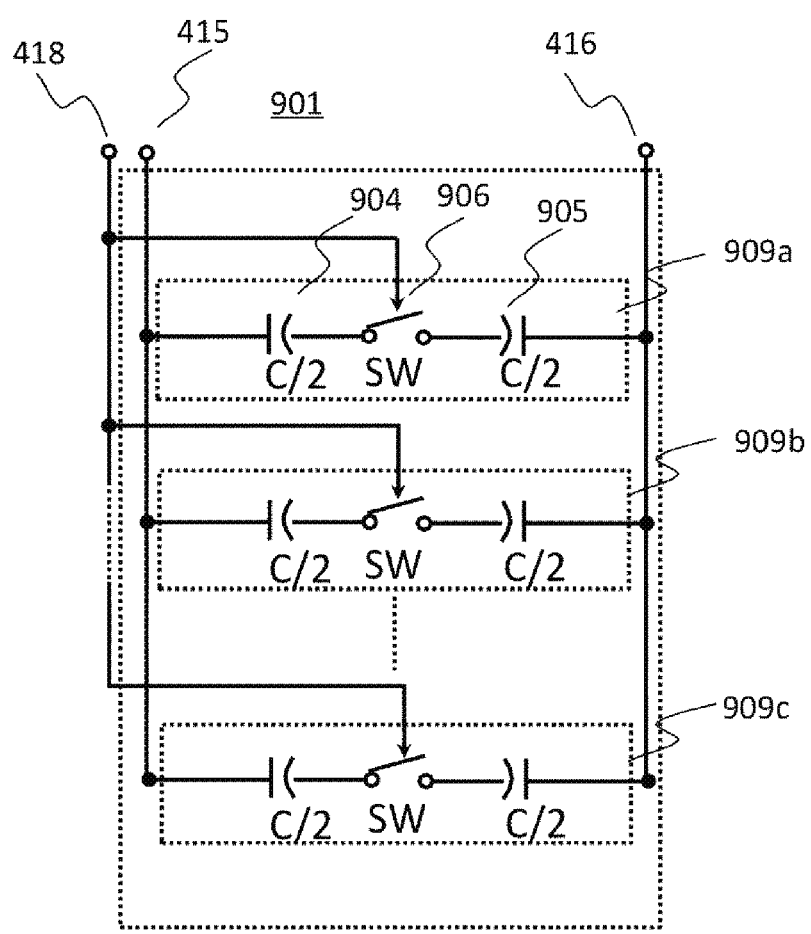
FIG. 7 is a circuit diagram illustrating an example of a zero point generation circuit of the equalizer according to Embodiment 1.

FIG. 7 illustrates an example of the zero point generation circuit 901 of the equalizer 400 in FIG. 1. Only one of the two zero generation circuits 901 included in the equalizer 400 of FIG. 1 is illustrated.

Now, it is assumed that the same zero point frequency is secured with the equalizer of the embodiment of FIG. 1 and the equalizer of the comparative example of FIG. 2. In this case, the capacitance value of a zero point generation unit circuit 909 of the embodiment illustrated in FIG. 7 becomes half of the capacitance value of the zero point generation unit circuit 909K of the comparative example illustrated in FIG. 3. That is, when the same zero point frequency is secured, as illustrated in FIG. 7, the capacitance values of capacitors 904 and 905 become the half, C/2.

Therefore, the physical size of the zero point generation unit circuit 909 can be reduced to half, and each of emitter wiring widths W is also reduced to half of that of the equalizer 400K in FIG. 2, which becomes W/2.

Figure 8:
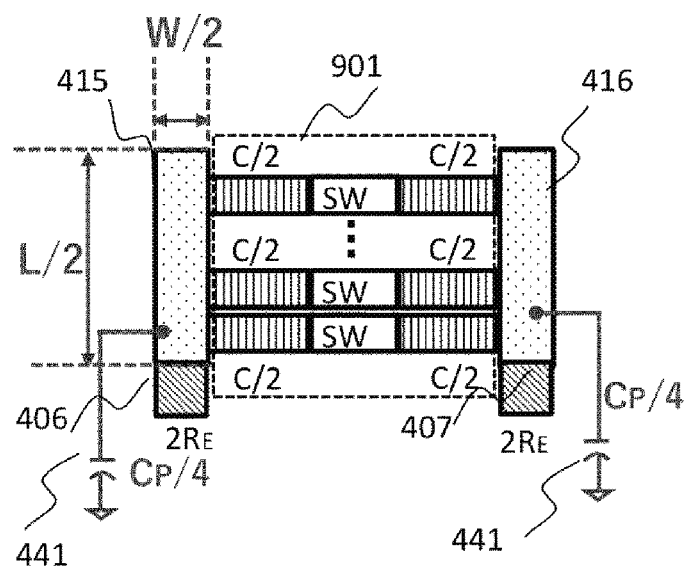
FIG. 8 is a layout image diagram of the emitter terminal wiring and the zero point generation circuit of the equalizer according to Embodiment 1.

FIG. 8 schematically illustrates a chip layout of the zero point generation circuit 901 of FIG. 7. Here, W which is the wiring width of the emitter node wiring 415 and 416 and L which is the wiring length of the emitter node wiring 415 and 416 are illustrated in comparison with FIG. 4.

As illustrated in the layout of the emitter node according to Embodiment 1 of the present invention illustrated in FIG. 8, in comparison with the equalizer 400K of the comparative example in FIG. 2, the emitter wiring width W is reduced to ½, the emitter wiring length L is reduced to ½, the emitter wiring area is reduced to WL/4, and as a result, an emitter node wiring parasitic capacitor 441 can be reduced to $C_P/4$.

As illustrated in FIG. 1, in the configuration of the embodiment, two zero point generation circuits 901 are provided, and thus in the actual layout, the layouts illustrated in FIG. 8 are juxtaposed. For example, on the layout arrangement, the emitter node wiring 415, 416, 427, and 428 of the first to fourth bipolar transistors 404, 405, 422, and 423 are arranged in an order of the emitter node wiring 415 of the first bipolar transistor, the emitter node wiring 416 of the second bipolar transistor, the emitter node wiring 427 of the third bipolar transistor, and the emitter node wiring 428 of the fourth bipolar transistor, in an arbitrary direction.

Figure 9A:
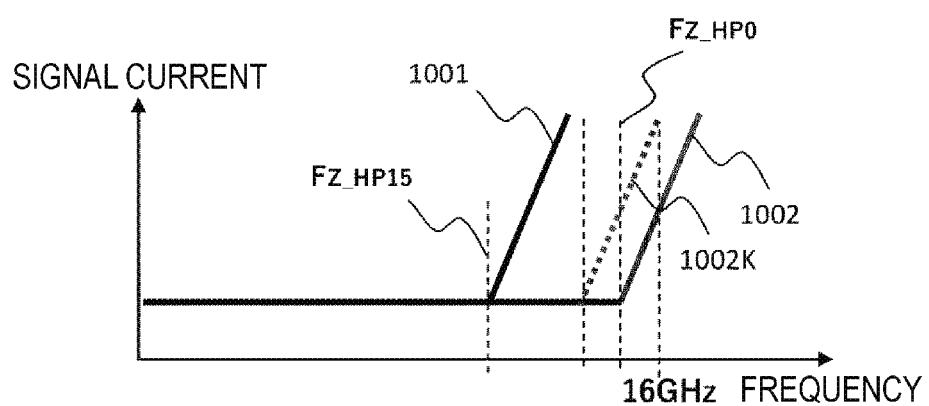
FIG. 9A is a graph schematically illustrating a signal current according to a zero point frequency of the equalizer according to Embodiment 1.
Figure 9B:
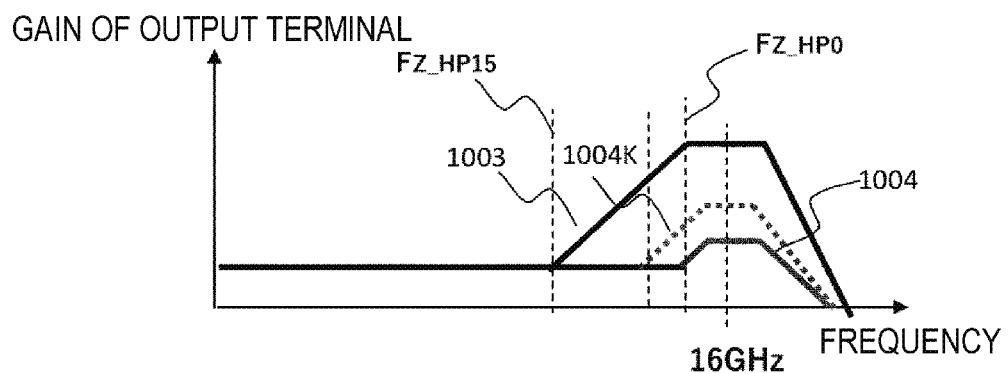
FIG. 9B is a graph schematically illustrating a gain of an output terminal by the zero point frequency of the equalizer according to Embodiment 1.

FIGS. 9A and 9B are graphs schematically illustrating signal currents and gains of output terminals depending on the zero point frequency of the equalizer according to Embodiment 1.

FIG. 9A is a graph schematically illustrating signal currents depending on the zero point frequency of the equalizer of FIG. 1. A frequency characteristic 10001 of the signal current when the upper limit gain is set and a frequency characteristic 1002 of the signal current when the lower limit gain is set are illustrated. Also, for comparison, the frequency characteristics 1002K of the signal current of the comparative example when the lower limit gain is set, which is illustrated in FIG. 5A is illustrated with a dotted line. The zero point frequency $FZ_{HP\_15}$ when the upper limit gain is set and the zero point frequency $FZ_{HP\_0}$ when the lower limit gain is set are illustrated.

Here, compared with the equalizer 400K of the comparative example of FIG. 2, the parasitic capacitance is $C_p/4$, and thus $$FZ_{HP\_15}=1/(2\pi \times RE\times(C_p/4+C_{HF\_15})),$$

$$FZ_{HP\_0}=1/(2\pi \times RE\times(C_p/4+C_{HF\_0})), \text{ and}$$

$$C_{HF\_15}>C_{HF\_0}$$

are satisfied. RE is a resistance value of the resistors 406 and 407.

FIG. 9B is a graph schematically illustrating the gain of the output terminal depending on the zero point frequency of the equalizer of FIG. 1. A frequency characteristic 1003 of the gain of the equalizer when the upper limit gain is set and a frequency characteristic 1004 of the gain of the equalizer when the lower limit gain is set are illustrated. For comparison, the frequency characteristic 1004K of the gain of the comparative example when the lower limit gain is set, which is illustrated in FIG. 5B, is illustrated with a dotted line. The zero point frequency $FZ_{HP\_15}$ when the upper limit gain is set and the zero point frequency $FZ_{HP\_0}$ when the lower limit gain is set are illustrated.

As illustrated in FIGS. 9A and 9B, if the wiring parasitic capacitor is $C_p/4$, the zero point frequency when the lower limit gain is set can be $1/(2\pi \times RE\times(C_p/4+C_{HF\_0}))$, and as illustrated in FIG. 9A, the zero point frequency can be shifted to the high frequency side than the circuit in the related art. Therefore, as illustrated in FIG. 9B, the gain at a desired frequency (for example, 16 GHz) when the lower limit gain is set in the output terminal can be reduced to be lower than that of the circuit in the related art. With respect to the zero point frequency when the upper limit gain is set, $1/(2\pi \times RE\times(C_p/4+C_{HF\_15}))$ is satisfied, and the parasitic capacitance reduction is reflected. However, since $C_p/4 \ll C_{HF\_15}$ is satisfied, the influence on the maximum equalization gain is slight.

Figure 10:
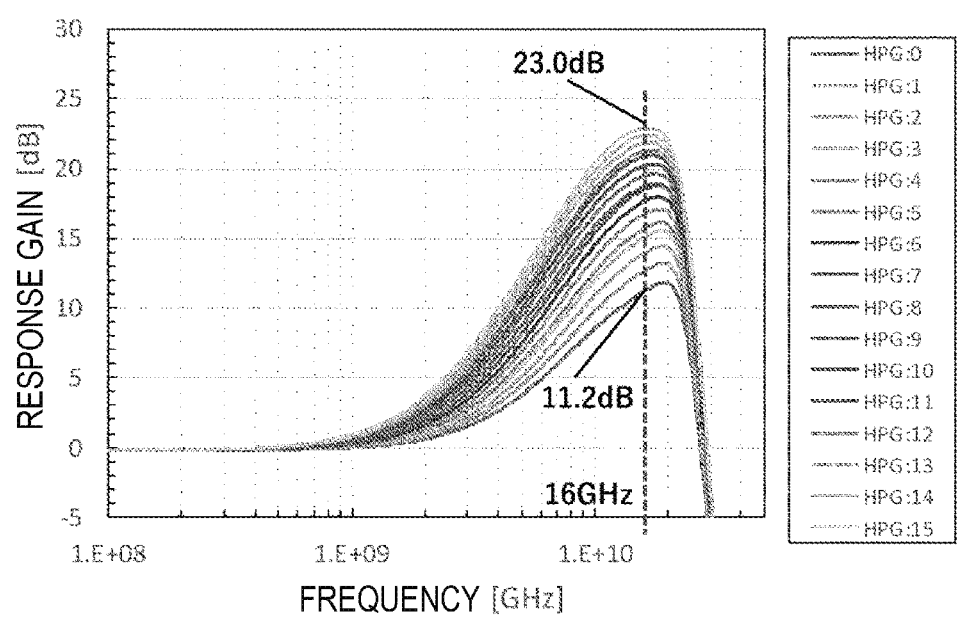
FIG. 10 is a graph illustrating a simulation result of a variable gain range of the equalizer of the comparative example.
Figure 11:
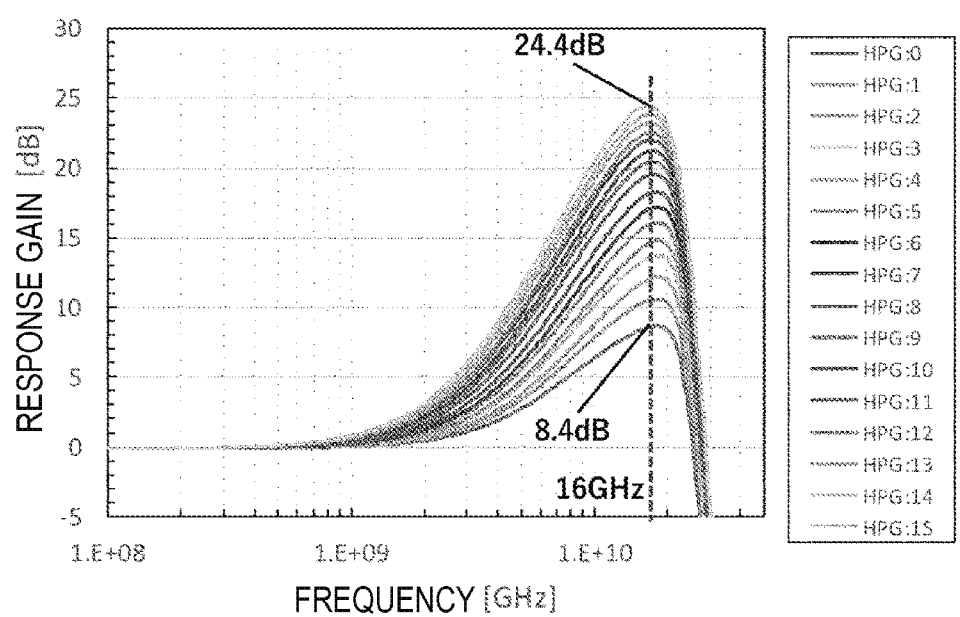
FIG. 11 is a graph illustrating a simulation result of a variable gain range of the equalizer according to Embodiment 1.

FIGS. 10 and 11 respectively illustrate simulation results when gain settings of the equalizer of the comparative example and the equalizer according to Embodiment 1 of the present invention are adjusted from the lower limit gain setting to the upper limit gain setting.

In the equalizer 400K of the comparative example illustrated in FIG. 10, the equalization gain at 16 GHz when the lower limit gain is set is 11.2 dB, the equalization gain when the upper limit gain is set is 23 dB, and the variable gain range is 11.8 dB.

As illustrated in FIG. 11, in the equalizer 400 according to Embodiment 1 of the present invention, the equalization gain at 16 GHz when the lower limit gain is set is 8.4 dB, the equalization gain when the upper limit gain is set is 24.4 dB, and the variable gain range is 16 dB. As a result, compared with the equalizer 400K of the comparative example, it can be confirmed that the equalizer 400 according to Embodiment 1 of the present invention can be set so that the gain when lower limit gain is set can be set to be 2.8 dB lower, and as a result, and the variable gain range can be set to be 4.8 dB wider.

In Embodiment 1 of the present invention, the collector terminals having the same polarity of the two differential pairs are connected to each other, the collector terminals are connected to the emitter terminals of the fifth and sixth bipolar transistors 409 and 410, the wiring areas of the collector nodes increase, and accordingly, the parasitic capacitance of the collector nodes increases. However, the fifth and sixth bipolar transistors have configurations of the cascode amplifier, so the influence of the parasitic capacitor is low, and the negative influence on the high frequency characteristics is small.

Figure 12:
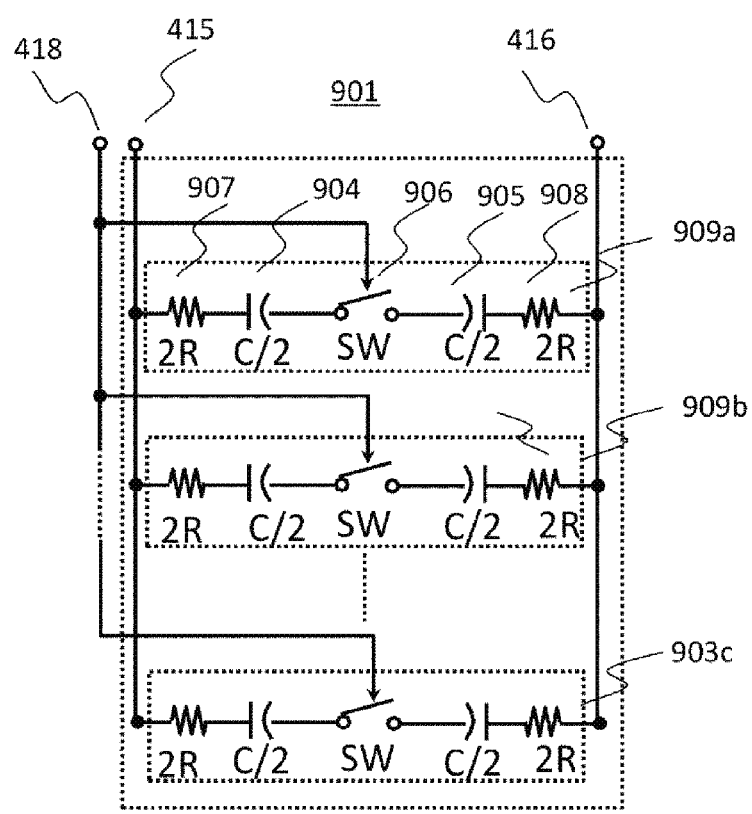
FIG. 12 is a circuit diagram illustrating another example of the zero point generation circuit of the equalizer according to Embodiment 1.

FIG. 12 is a circuit diagram illustrating another example of the zero point generation circuit of the equalizer according to Embodiment 1. The configuration elements of the zero point generation unit circuit that configure the equalizer 400 are not limited to the capacitors 904 and 905 only, and a combination of the capacitors and the resistors 907 and 908 may be used as illustrated in FIG. 12.

As described in the following embodiments, in the configuration in which zero point generation circuits having different frequency characteristics are mixed, a zero point generation unit circuit of a certain zero point generation circuit can have the configuration of FIG. 7, and the zero point generation unit circuit of another zero point generation circuit can have the configuration as illustrated in FIG. 12.

Figure 13:
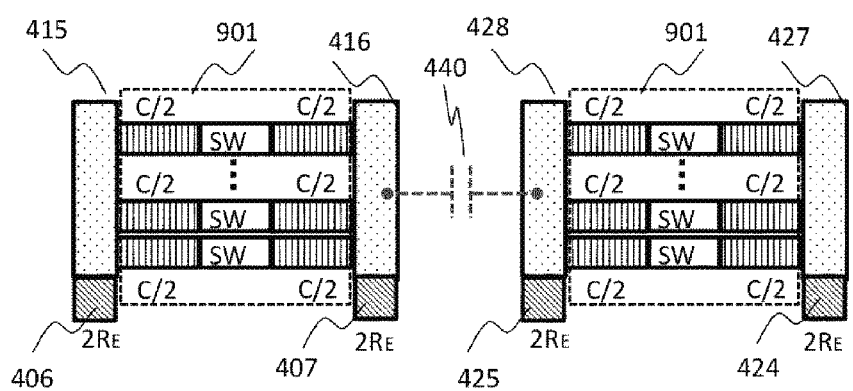
FIG. 13 is a layout image diagram illustrating one pattern of a layout arrangement according to Embodiment 1.

As illustrated in the layout image diagram of FIG. 13, the emitter wiring of the two differential pairs can be arranged to have the same polarity as illustrated in the diagram, and the influence of the parasitic capacitor can be further reduced.

In this layout, on the layout arrangement, the emitter node wiring 415, 416, 427, and 428 of the first to fourth bipolar transistors 404, 405, 422, and 423 are arranged in an order of the emitter node wiring 415 of the first bipolar transistor, the emitter node wiring 416 of the second bipolar transistor, the emitter node wiring 428 of the fourth bipolar transistor, and the emitter node wiring 427 of the third bipolar transistor, in an arbitrary direction.

Figure 14:
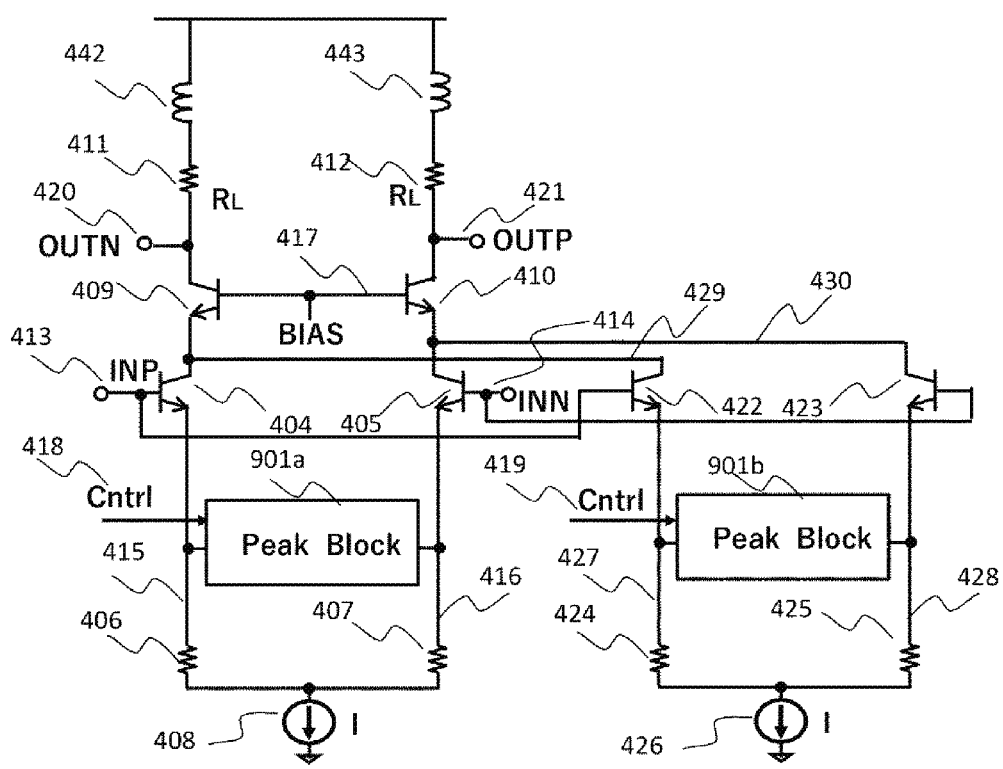
FIG. 14 is a circuit diagram illustrating a modification example of the equalizer according to Embodiment 1.

As illustrated in FIG. 14, if inductors 442 and 443 are connected respectively to the load resistors 411 and 412, the parasitic capacitance of the output terminals 420 and 421 or a capacitive component serving as a load can be canceled, and thus the peak gain on the higher frequency side can be secured. The control signals 418 and 419 for controlling the changeover switch of the zero point generation circuits 901 are separate control signals, but may be the same signal. If the same control signal is used, the circuit characteristics of the two differential pairs become more identical to each other, and thus the saturation characteristics when a particularly greater signal is used are improved.

In Embodiment 1 of the present invention, the bipolar transistor is described, but the same effect can be obtained also by using a metal-oxide-semiconductor field-effect transistor (MOSFET). In Embodiment 1 of the present invention, the differential pairs and the zero point generation circuits 901 are configured to be divided into two, but it is obvious that the same effect can be obtained by dividing the components into three or four.

By the above description, according to Embodiment 1 of the present invention, the minimum equalization gain when the lower limit gain is set can be reduced, and as a result, it is possible to provide an equalizer having a wide variable gain range and capable of realizing equalization for a communication medium such as on-board wiring or a cable having various wiring lengths.

Embodiment 2

Figure 15:
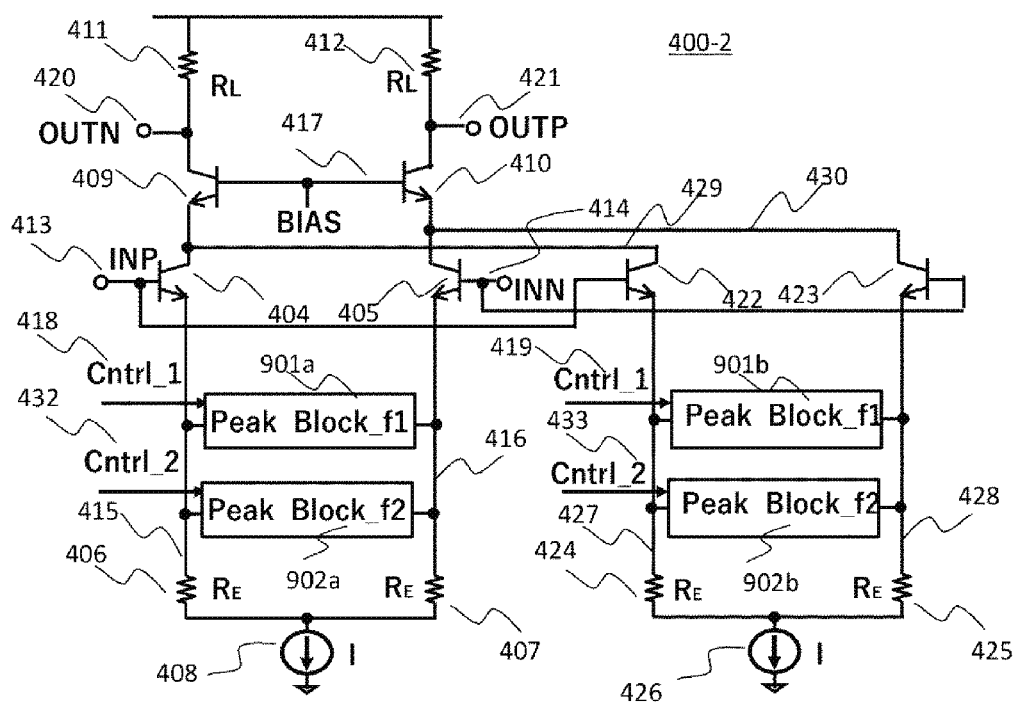
FIG. 15 is a circuit diagram illustrating an equalizer according to Embodiment 2.

FIG. 15 illustrates a circuit diagram of an equalizer 400-2 according to Embodiment 2. The same components as those of the equalizer 400 of FIG. 1 are denoted by the same reference numerals, and the differences thereof are mainly described. In the equalizer 400-2 of FIG. 15, the zero point generation circuits 901a and 901b having the zero point frequency in a first frequency band and zero point generation circuits 902a and 902b having the zero point frequency in a second frequency band are connected between the emitter node wiring 415 and 416 and between emitter node wiring 427 and 428 of the two differential pairs.

The zero point generation circuits 901a and 901b in the first frequency band have the same peak characteristic, and the peak characteristics of the zero point generation circuits 901a and 901b can be adjusted by the control signals 418 and 419. The zero point generation circuits 902a and 902b in the second frequency band have the same peak characteristic, and the peak characteristics of the zero point generation circuits 902a and 902b can be adjusted by the control signals 432 and 433.

In Embodiment 2, the zero point generation circuits 901 having the zero point frequency in the first frequency band and the zero point generation circuits 902 having the zero point frequency in the second frequency band are connected, the equalization gains can be independently set for respective frequency bands. Therefore, together with a wide variable gain range of Embodiment 1, a wide frequency band can be compensated, and thus it is possible to provide an equalizer capable of realizing equalization for a communication medium such as on-board wiring or a cable having various wiring lengths.

Embodiment 3

Figure 16:
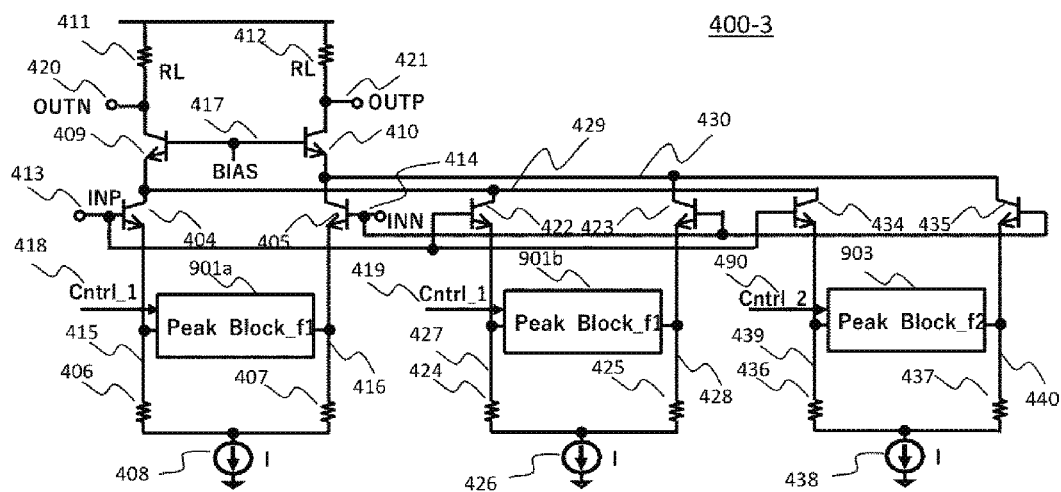
FIG. 16 is a circuit diagram illustrating an equalizer according to Embodiment 3.

FIG. 16 illustrates a circuit diagram of an equalizer 400-3 according to Embodiment 3. The same components as those of the equalizer 400 of FIG. 1 are denoted by the same reference numerals, and the differences thereof are mainly described. The equalizer 400-3 of FIG. 16 has three differential pairs configured with six bipolar transistors of the first to fourth bipolar transistors 404, 405, 422, and 423 and seventh and eighth bipolar transistors 434 and 435 having the common base input terminals. A bias current source 438 is provided for the third differential pair.

In two differential pairs among the three differential pairs, the resistors 406, 407, 424, and 425 and the zero point generation circuits 901a and 901b having the zero point frequency in the first frequency band are connected respectively between the emitter node wiring 415 and 416 and between the emitter node wiring 427 and 428.

In the remaining one differential pair among the three differential pairs, resistor elements 436 and 437 and a zero point generation circuit 903 having the zero point frequency in the second frequency band are connected between emitter terminals 439 and 440.

The collector terminals having the same polarity of the three differential pairs are connected respectively to the wiring 429 and 430. These collector terminals are connected to the emitter terminals of the fifth and sixth bipolar transistors 409 and 410 in the same manner as the example of FIG. 1. The zero point generation circuits 901a and 901b in the first frequency band have the same peak characteristics, and the peak characteristics of the zero point generation circuits 901 can be adjusted by the control signals 418 and 419. The peak characteristics of the zero point generation circuit 903 of the second frequency band can be adjusted by a control signal 490.

In Embodiment 3, since the zero point generation circuits 901 having the zero point frequency in the first frequency band and the zero point generation circuit 903 having the zero point frequency in the second frequency band are realized in the different differential pairs, if the first frequency band is used for high frequency equalization, the number of connected elements can be reduced than in Embodiment 2, and thus it is possible to secure a wider variable gain range at a higher frequency band than in the equalizer according to Embodiment 2.

Embodiment 4

An equalizing device in which the equalizer described in Embodiments 1 to 3 is employed is described.

Figure 17:
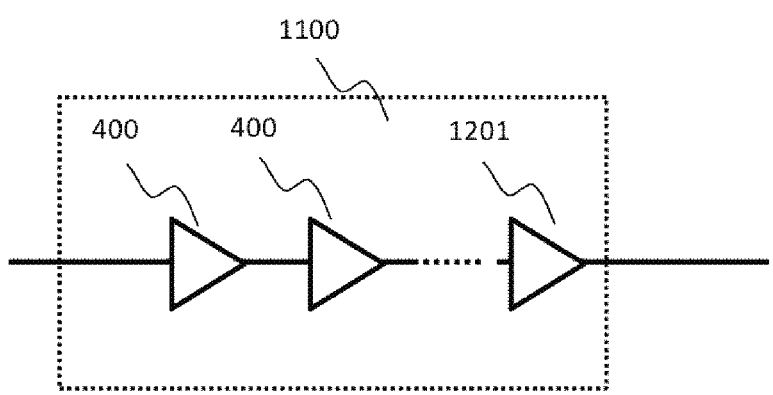
FIG. 17 is a circuit diagram illustrating an equalizing device according to Embodiment 4.

As illustrated in FIG. 17, an equalizing device 1100 in Embodiment 4 has at least one equalizer 400 described in Embodiments 1, 2, and 3, and a driver circuit 1201 for driving the input impedance of the reception LSI connected via a communication medium such as on-board wiring or a cable on a subsequent stage of the equalizing device 1100 is provided at a final stage. The function of the equalizing device 1100 in Embodiment 4 is described below.

Figure 18:
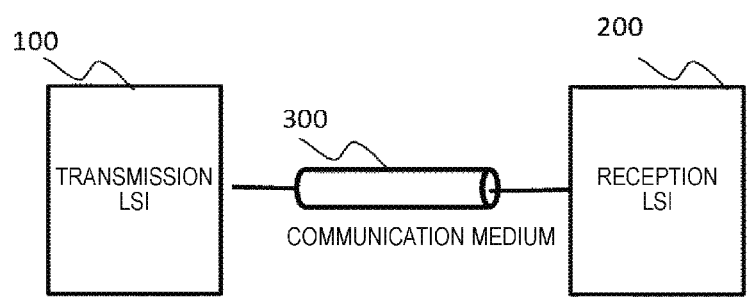
FIG. 18 is a block diagram illustrating an electric signal transmission device that performs communication via a communication medium.

FIG. 18 illustrates a communication device including a transmission LSI 100 that transmits a data signal, a communication medium 300 such as on-board wiring or a cable that transmits communication data, and a reception LSI 200 that receives a data signal.

Figure 19:
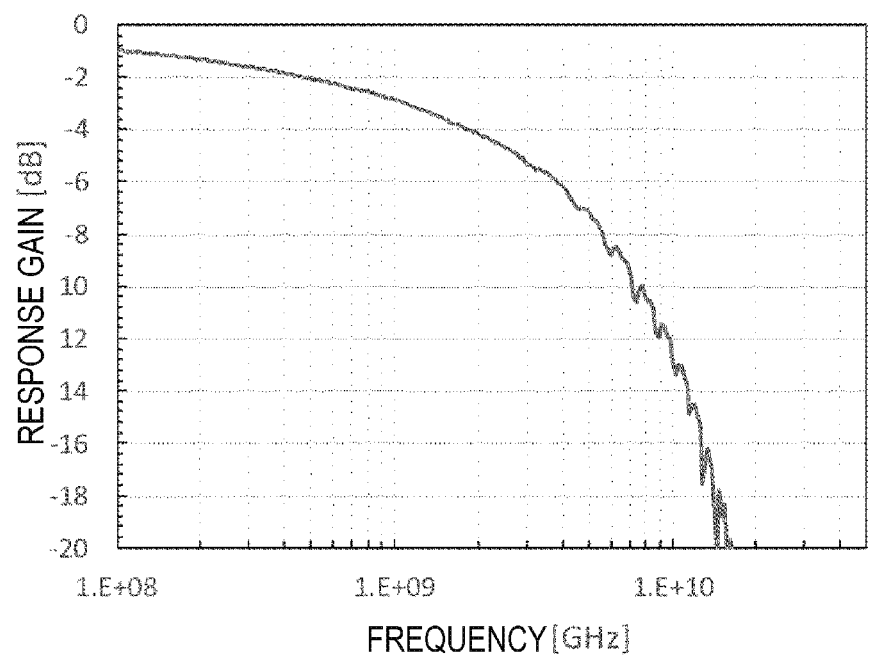
FIG. 19 is a graph illustrating frequency characteristics of loss in a communication medium.

FIG. 19 is a graph illustrating frequency characteristics of loss in the communication medium 300. Here, the data signal at the receiving end of the reception LSI 200 has a frequency-dependent loss as illustrated in FIG. 19 due to the loss in the communication medium 300.

Figure 20:
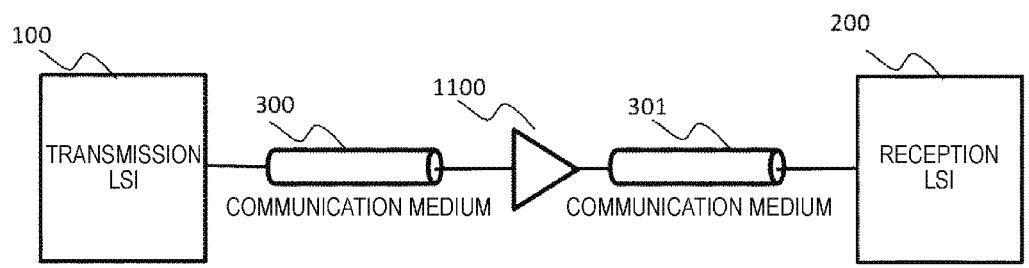
FIG. 20 is a block diagram illustrating an electric signal transmission device that has the equalization device relating to Embodiment 4 or 5 and performs communication via communication media.
Figure 21:
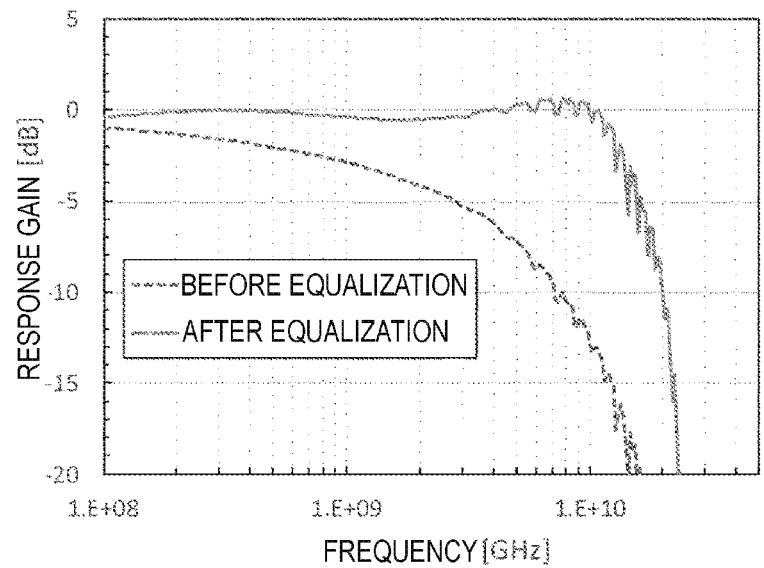
FIG. 21 is a graph illustrating a simulation result obtained by equalizing a loss in a communication medium by using the equalizing device according to Embodiment 4.

If the equalizing device 1100 is inserted in a subsequent stage of the communication medium 300 as illustrated in FIG. 20, the loss in the communication medium 300 can be equalized and compensated as illustrated in FIG. 21.

Accordingly, the connection to the reception LSI can be performed via a communication medium 301 in the subsequent stage of the equalizing device 1100, and as a result, the communication distance between the transmission LSI and the reception LSI can be extended. That is, a communication system that extends the communication distance can be realized by adding the equalizing device 1100 according to Embodiment 4.

For example, when the equalizer 400 illustrated in FIG. 1 is employed in the equalizing device 1100, the equalizing device 1100 includes a differential signal input terminal (not illustrated) that input differential signals P and N transmitted via the communication medium 300. The differential signals P and N input from the differential signal input terminal are input to the base input terminals 413 and 414 of the equalizer 400. Also, a signal processed in the equalizer 400 has a configuration of being output from the differential signal output terminal (not illustrated) of the equalizing device 1100 via the output terminals (OUTP and OUTN) 420 and 421 (collector terminals of the bipolar transistors 409 and 410).

Embodiment 5

Figure 22:
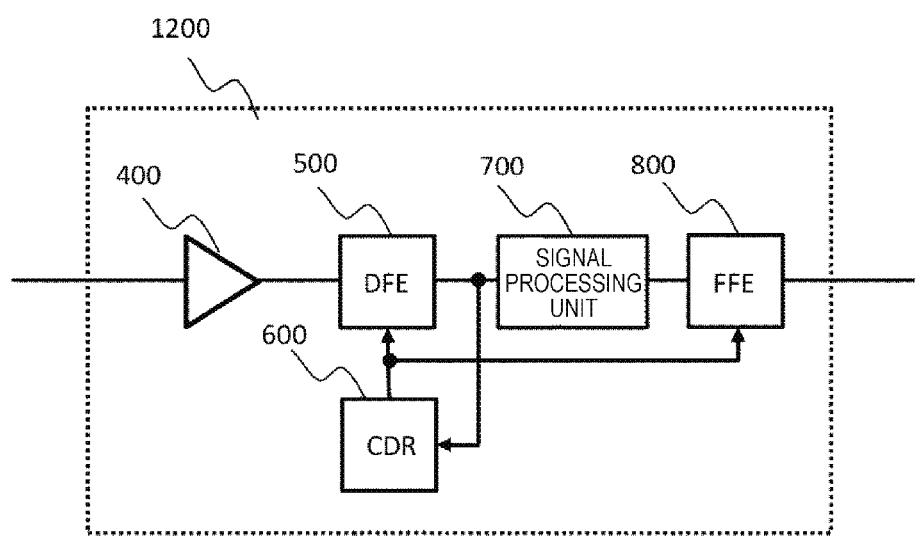
FIG. 22 is a block diagram illustrating an equalizing device according to Embodiment 5, a transmission unit of a transmission LSI, and a reception unit of a reception LSI.

As illustrated in FIG. 22, an equalizing device 1200 in Embodiment 5 is configured with the equalizer 400 described in Embodiments 1, 2, and 3, a decision feedback equalizer (DFE) 500, a clock data recovery (CDR) 600, a signal processing unit 700, and a feed forward equalizer (FFE) 800. In the above configuration, the input data signal is equalized, the equalized received signal is processed by the signal processing unit 700, and then, signal processing data is output via the FFE 800.

The equalizer 400 equalizes the received data signal, and the DFE 500 equalizes the output signal of the equalizer 400 at the timing of a reception clock from the CDR 600 and outputs the received data. The DFE 500 may include an analog to digital converter (ADC). The CDR 600 receives the received data processed in the DFE 500 and generates a reception clock and a transmission clock in which timings of the clocks are adjusted. The data signal processed in the signal processing unit 700 is output as the transmission data equalized by the FFE 800 at the timing of the transmission clock. The equalizing device 1200 according to Embodiment 5 can be used as the equalizing device 1100 in the communication system illustrated in FIG. 18, a transmission unit of the transmission LSI 100, and a reception unit of the reception LSI 200, and as a result, it is possible to provide an equalizing device having a wide variable gain range and capable of realizing equalization for a communication medium such as on-board wiring or a cable having various wiring lengths.

What is claimed is:

1. An equalizer to which a signal transmitted via a communication medium is input, the equalizer comprising:
   a first differential pair configured with a first transistor and a second transistor; and
   a second differential pair configured with a third transistor and a fourth transistor;
   wherein a first terminal of the first transistor and a first terminal of the third transistor are connected to each other, and a first terminal of the second transistor and a first terminal of the fourth transistor are connected to each other, so that the first differential pair and the second differential pair have common input terminals,
   resistors are respectively connected to second terminals of the first, second, third, and fourth transistors,
   a first zero point generation circuit is connected between the second terminal of the first transistor and the second terminal of the second transistor, and a second zero point generation circuit is connected between the second terminal of the third transistor and the second terminal of the fourth transistor, and
   the first zero point generation circuit and the second zero point generation circuit have the same peak characteristic.

2. The equalizer according to claim 1, further comprising:
   a fifth transistor; and
   a sixth transistor,
   wherein a third terminal of the first transistor and a third terminal of the third transistor are connected to each other and are connected to a second terminal of the fifth transistor,
   a third terminal of the second transistor and a third terminal of the fourth transistor are connected to each other and are connected to a second terminal of the sixth transistor, and
   a certain bias voltage is applied to the fifth and sixth transistors, a third terminal of the fifth transistor is connected to a load configured with a first resistor, a third terminal of the sixth transistor is connected to a load configured with a second resistor, and the third terminal of the fifth transistor and the third terminal of the sixth transistor become output terminals.

3. The equalizer according to claim 2,
   wherein each of the first zero point generation circuit and the second zero point generation circuit is configured with one or more zero point generation unit circuits, and each of the zero point generation unit circuits is configured with a capacitive element and a switch element, and
   the switch element of the zero point generation unit circuit is intermittently switched with a control signal, to enable zero point frequencies of the first zero point generation circuit and the second zero point generation circuit to be switched.

4. The equalizer according to claim 2,
   wherein each of the first zero point generation circuit and the second zero point generation circuit is configured with one or more zero point generation unit circuits,
   each of the zero point generation unit circuits is configured with a capacitive element, a resistor element, and a switch element, and
   the switch element of the zero point generation unit circuit is intermittently switched with a control signal, to enable zero point frequencies of the first zero point generation circuit and the second zero point generation circuit to be switched.

5. The equalizer according to claim 2,
   wherein the first zero point generation circuit that equalizes a first frequency band and at least one third zero point generation circuit that equalizes a frequency band different from the first frequency band are connected between the second terminals of the first differential pair,
   the second zero point generation circuit that equalizes a first frequency band and at least one fourth zero point generation circuit that equalizes a frequency band different from the first frequency band are connected between the second terminals of the second differential pair, and
   the third zero point generation circuit and the fourth zero point generation circuit have the same peak characteristic.

6. The equalizer according to claim 5,
wherein each of the first zero point generation circuit, the second zero point generation circuit, the third zero point generation circuit, and the fourth zero point generation circuit is configured with one or more zero point generation unit circuits,
each of the zero point generation unit circuits is configured with a capacitive element and a switch element, and
the switch element of the zero point generation unit circuit is intermittently switched with a control signal, to enable a zero point frequency of each of the first zero point generation circuit, the second zero point generation circuit, the third zero point generation circuit, and the fourth zero point generation circuit to be switched.

7. The equalizer according to claim 1, further comprising:
a third differential pair configured with a seventh transistor and an eighth transistor,
wherein the first terminal of the first transistor, the first terminal of the third transistor, and a first terminal of the seventh transistor are connected to each other, and the first terminal of the second transistor, the first terminal of the fourth transistor, and a first terminal of the eighth transistor are connected to each other, so that the three differential pairs have common input terminals,
resistors are respectively connected to second terminals of the first, second, third, fourth, seventh, eighth transistors,
the first zero point generation circuit that equalizes a first frequency band is connected between the second terminals of the first differential pair,
the second zero point generation circuit that equalizes a first frequency band is connected between the second terminals of the second differential pair,
at least one fifth zero point generation circuit that equalizes a frequency band different from the first frequency band is connected between second terminals of the third differential pair, and
the first zero point generation circuit and the second zero point generation circuit have the same peak characteristic.

8. The equalizer according to claim 7, further comprising:
a fifth transistor; and
a sixth transistor,
a third terminal of the first transistor, a third terminal of the third transistor, and a third terminal of the seventh transistor are connected to each other and are connected to a second terminal of the fifth transistor,
a third terminal of the second transistor, a third terminal of the fourth transistor, and a third terminal of the eighth transistor are connected to each other and are connected to a second terminal of the sixth transistor,
a certain bias voltage is applied to the fifth and sixth transistors, and
a third terminal of the fifth transistor is connected to a load configured with a first resistor, a third terminal of the sixth transistor is connected to a load configured with a second resistor, and the third terminal of the fifth transistor and the third terminal of the sixth transistor become output terminals.

9. The equalizer according to claim 8,
wherein each of the first zero point generation circuit, the second zero point generation circuit, and the fifth zero point generation circuit is configured with one or more zero point generation unit circuits,
each of the zero point generation unit circuits is configured with a capacitive element and a switch element,
the switch element of the zero point generation unit circuit is intermittently switched with a control signal, to enable a zero point frequency of each of the first zero point generation circuit, the second zero point generation circuit, and the fifth zero point generation circuit to be switched.

10. The equalizer according to claim 2,
wherein a series inductor is added to a resistor connected to the third terminal of the fifth transistor, and
a series inductor is added to a resistor connected to the third terminal of the sixth transistor.

11. The equalizer according to claim 8,
wherein a series inductor is added to a resistor connected to the third terminal of the fifth transistor, and
a series inductor is added to a resistor connected to the third terminal of the sixth transistor.

12. The equalizer according to claim 1,
wherein, on a layout arrangement, wiring of the second terminals of the first to fourth transistors is arranged in an order of second terminal wiring of the first transistor, second terminal wiring of the second transistor, second terminal wiring of the fourth transistor, and second terminal wiring of the third transistor, in an arbitrary direction.

13. The equalizer according to claim 1,
wherein the transistor is configured with a bipolar transistor or a MOS transistor,
if the transistor is a bipolar transistor, the first terminal is a base terminal, the second terminal is an emitter terminal, and the third terminal is a collector terminal, and
if the transistor is a MOS transistor, the first terminal is a gate terminal, the second terminal is a source terminal, and the third terminal is a drain terminal.

14. An equalizing device comprising:
at least one equalizer according to claim 1.

* * * * *